(12) United States Patent
Franckowiak et al.

(10) Patent No.: US 7,028,217 B2
(45) Date of Patent: Apr. 11, 2006

(54) SYSTEM AND METHOD OF GENERAL PURPOSE DATA REPLICATION BETWEEN MATED PROCESSORS

(75) Inventors: Edward J. Franckowiak, West Chicago, IL (US); Kenneth R. MacFarlane, Ijamsville, MD (US); Kurt A. Vangsness, Geneva, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 612 days.

(21) Appl. No.: 10/158,999

(22) Filed: May 31, 2002

(65) Prior Publication Data

US 2003/0005356 A1  Jan. 2, 2003

Related U.S. Application Data

(60) Provisional application No. 60/295,758, filed on Jun. 4, 2001.

(51) Int. Cl.
*G06F 11/00* (2006.01)
(52) U.S. Cl. .......................................... 714/11; 714/12
(58) Field of Classification Search .................. 714/11, 714/6, 10, 12, 13
See application file for complete search history.

(56) References Cited

U.S. PATENT DOCUMENTS

| | | | | |
|---|---|---|---|---|
| 5,832,222 A | * | 11/1998 | Dziadosz et al. | 709/216 |
| 5,968,185 A | * | 10/1999 | Bressoud et al. | 714/10 |
| 6,247,141 B1 | * | 6/2001 | Holmberg | 714/2 |
| 6,735,717 B1 | * | 5/2004 | Rostowfske et al. | 714/13 |

* cited by examiner

*Primary Examiner*—Dieu-Minh Le

(57) ABSTRACT

A system and method of replicating changed data between an active process and a standby process is provided. The active and standby processes each include an application and a processor having memory. The method includes organizing active and standby processor memories into regions, with each region including one or more tuples, datamarking the tuples having changed data in the active processor corresponding to the active application, and transferring copies of the changed data from the active process to the standby process to replicate data between the active and standby processors. The system includes means for datamarking changed data and transferring copies of the changed data between active and standby processes having active and standby processors configured as mated pairs. The system can include a wireless cellular communication network having an active process including an active radio control software application running on an active processor and a standby process including a standby radio control software application running on a standby processor.

34 Claims, 6 Drawing Sheets

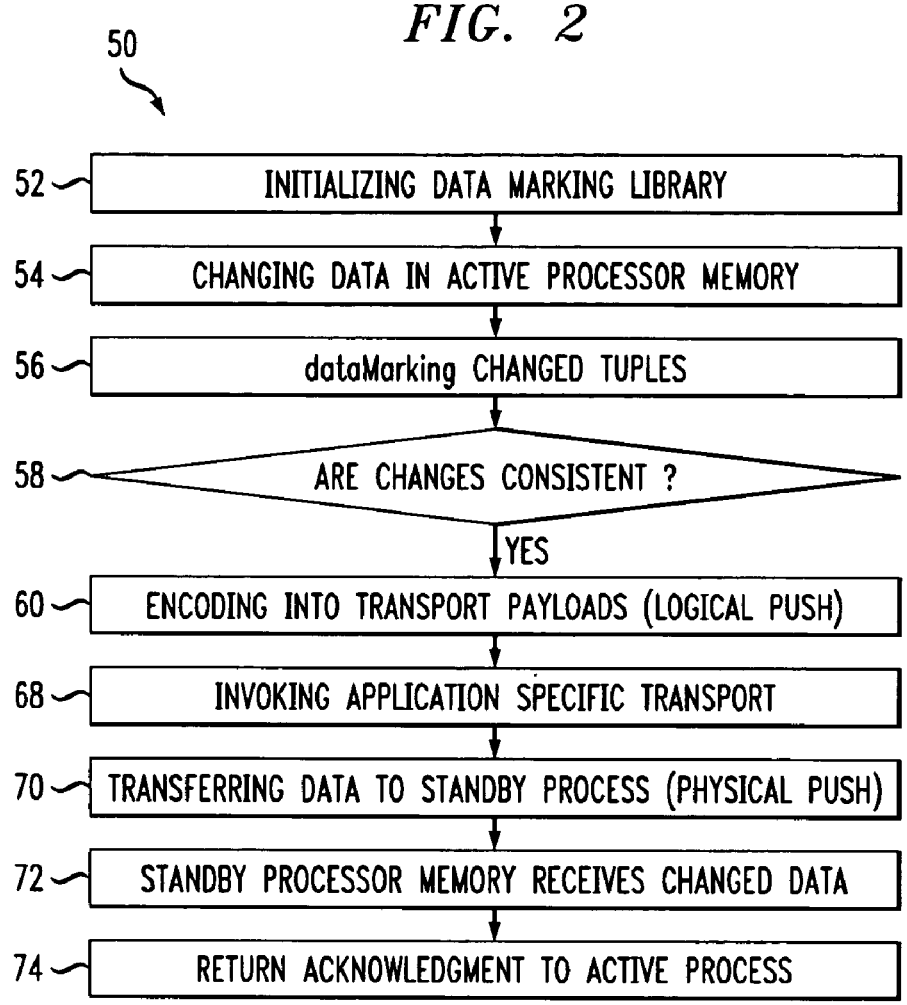
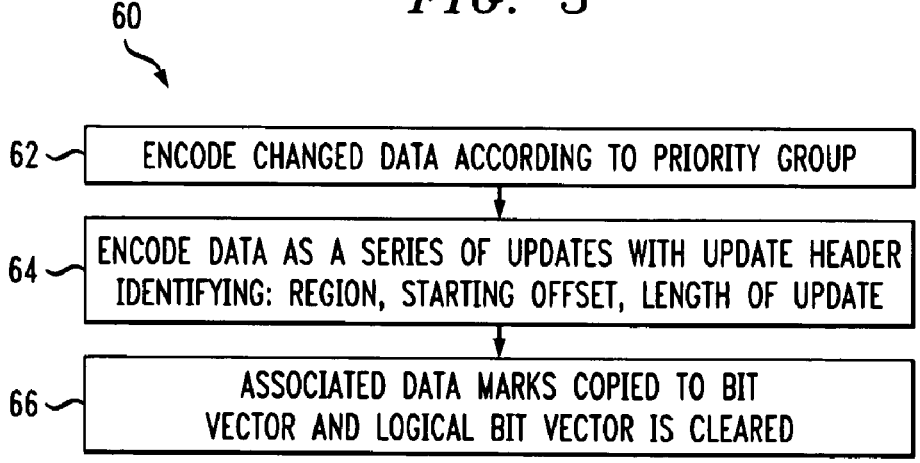

SYSTEM AND METHOD OF GENERAL PURPOSE DATA REPLICATION BETWEEN MATED PROCESSORS

CROSS REFERENCE TO RELATED APPLICATIONS

This application claims the benefit under 35 U.S.C. 119(e) of the provisional application Ser. No. 60/295,758 filed Jun. 4, 2001, which is hereby incorporated by reference herein.

BACKGROUND OF THE INVENTION

The present invention relates to a system and method of data replication. More particularly, it relates to a system and method of replicating data between an active and standby mated processor pair for achieving high availability.

The present invention will be described in the context of a cellular wireless communication network, although it should be appreciated that the invention is applicable to a variety of mated processor systems and methods providing high availability.

A typical cellular wireless communication networks is made up of a plurality of cells each occupying a separate geographical area. Each cell usually includes a cell site having known hardware necessary for providing wireless communication coverage to a plurality of wireless terminals within the cell. Examples of such hardware can include, but is not limited to, radio frequency transmitters and receivers, antenna systems, interface equipment and power sources.

The cell site typically communicates with one or more application processors which handle access network resources such as radios, channels and the like within the cell. Software applications, known as Radio Control Software (RCS), running on these application processors manage the associated call and maintenance traffic to, from, and within the cell. Several cell sites typically communicate with a Mobile Switching Center (MSC) which switches cellular calls to wired central offices to enable mobile terminals to communicate with phones over the Public Switched Telephone Network (PSTN).

The PSTN offers users the benefit of high availability of service which means call service interruptions are rare. As the use of wireless networks grows and the capacity of wireless networks increases, end users and service providers are becoming more concerned about increasing the availability of the processors and software applications which handle calls thereby reducing service interruptions for callers. Interruptions in wireless communication service can be created when hardware and/or software fails or is taken off line for repairs, maintenance, updates, etc. High availability of wireless communication services is sought to make cellular communications a viable alternative to PSTN.

In an effort to achieve high availability, RCS application processors are paired to form mated processor pairs in an active/standby arrangement. When a fault occurs on the active processor, the standby process is elevated to the active role to continue providing service.

In conventional data replication methods involving mated processor arrangements, the process taking over the active role typically performs a data diffing technique in which regions of memory are compared and areas that have changed are identified and sent to the standby process. Alternatively, the active process sends a bulk transfer of all current data to the standby process.

However, these methods are not suitable for unplanned faults where the current active process fails. And for non-failure cases, these approaches introduce an interval during the switchover where all new activity must be suspended until the standby process is prepared to take over. These methods can also be CPU intensive, requiring significant processing resources, reducing the amount of normal application tasks the processors can handle while also replicating data. It is desirable to provide an improved system and method of data replication.

Not only should the system and method of data replication system assist in replicating data between the active and standby sides of an application as quickly and efficiently as possible, but it is also desirable to know at all times whether the standby side's data is consistent with that of the active side.

Further, conventional hardware and software data replication solutions typically specify a transport protocol that the application must use. Also, existing implementations typically require strong typing of data and high application involvement in the replication process, for example requiring explicit copying of data in and out of replication buffers. Thus, these solutions are generally application specific which increases costs and prevents portability. It is desirable to provide a data replication solution which is not application specific and which enables the application to specify the transport protocol.

SUMMARY OF THE INVENTION

According to the present invention, a new and improved system and method of replicating changed data between an active process and a standby process is provided. The active and standby processes each include an application and a processor having memory.

In accordance with a first aspect of the invention, the method includes organizing active and standby processor memories into regions, with each region including one or more tuples, datamarking the tuples having changed data in the active processor corresponding to the active application, and transferring copies of the changed data from the active process to the standby process to replicate data between the active and standby processors.

In accordance with a second aspect of the invention, the method also includes encoding the changed data into transport payloads for updates to the standby processor memory.

In accordance with another aspect of the invention, the organizing step also includes organizing the regions into priority groups and the encoding step includes encoding changed data according to the priority groups.

In accordance with another aspect of the invention, the datamarking step includes mapping the range of addresses of the changed data and marking the mapped regions containing the changed tuples.

In accordance with another aspect of the invention, a system is provided for replicating data. The system includes a mated pair of application processors including an active processor for running an active application and a standby processor for running a standby application. The active and standby processors each have corresponding memories divided into corresponding regions and tuples. The system includes datamarking means for mapping and marking tuples of data changed in the active processor memory, encoding means for encoding the changed data into transport payloads, and transferring means for transferring the changed data to the standby processor.

In accordance with another aspect of the invention, the system can include a wireless cellular communication network having an active process including an active radio control software application running on an active processor and a standby process including a standby radio control software application running on a standby processor.

BRIEF DESCRIPTION OF THE DRAWINGS

The invention may take form in certain components and structures, preferred embodiments of which will be illustrated in the accompanying drawings wherein:

FIG. 2 is a block diagram illustrating the invention;

FIG. 3 is a block diagram illustrating the encoding step shown in FIG. 2;

DETAILED DESCRIPTION OF THE INVENTION

It is to be understood that the specific devices and processes illustrated in the attached drawings, and described in the following specification are simply exemplary embodiments of the inventive concepts defined in the appended claims. As used herein, unless stated otherwise, the term process refers to one or more software applications and one or more associated application processors for running the software applications.

The invention includes a Data Marking Library (DML), also known as a Data Replication Service (DRS), which is a general purpose system and method supporting replication of global application data between an active and standby process in a reliable processor pair and/or cluster. The invention provides a way for an arbitrary application to identify regions of data within the application that are to be replicated to the mate process so that the mate process becomes a "hot" standby process, ready to take over processing from the active process. By keeping a record of changes to data as the changes are made, the invention quickly and efficiently replicates the pertinent subset of data within the active process. This enables the standby process to take over the active role with a reduced level of initialization and reduces downtime resulting from the recovery of failures that impact the active application.

The invention treats the application data as blocks of data within regions of memory, thereby providing the ability to replicate the data without having to know the structure of the data. The invention provides this functionality without specifying a transport. These features increase the portability of the invention across various applications and platforms.

Figure 1:
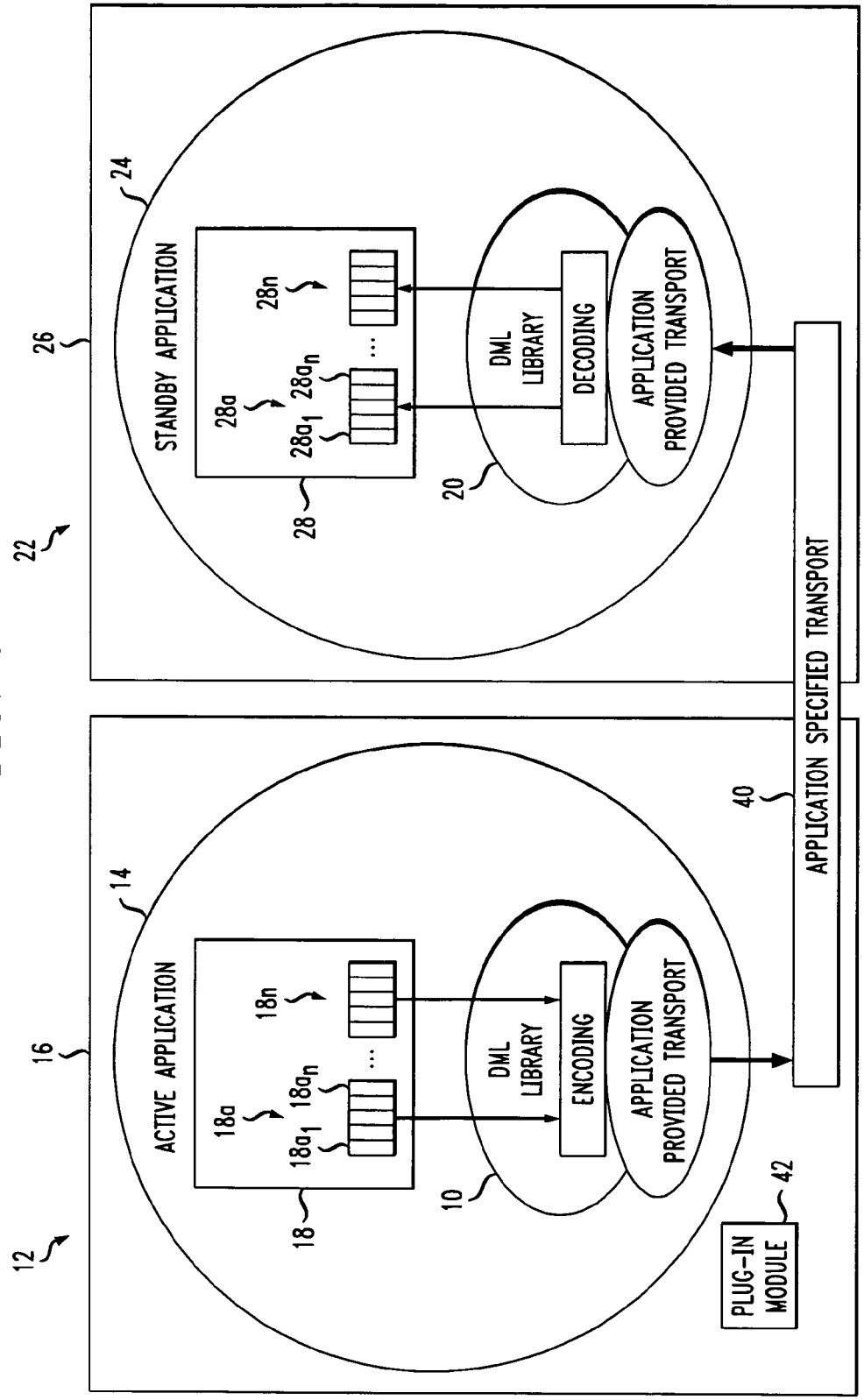
FIG. 1 is a block diagram of a general purpose system for data replication between mated processor pairs in accordance with the invention.

Referring to FIG. 1, a block diagram illustrating the relationship of an active DML instance 10 to an active process 12 and standby DML instance 20 a standby process 22 is shown. The active process 12 includes an active application 14 running on an active application processor 16. The standby process 22 includes a standby application 24 running on a standby application processor 26. More than one application 14, 24 may run on an application processor. The DML instances 10, 20 are shared libraries, part of application process space, which can be updated without rebuilding the applications 14 and 24 respectively.

Each DML instance 10, 20 has an identified role, active or standby, that changes its behavior. Usually, the roles are set to active or standby to match the roles of the corresponding application 14, 24. A special initRole is provided that is used by the application 14, 24 to indicate that it is going through some level of initialization that invalidates the data that has been replicated as descried in further detail below.

The applications 14, 24 can be any known applications for use in a high availability computing system having active and standby processors 16, and 26, though for the purposes of example which should not be considered as limiting, the preferred embodiment is described as a cellular wireless communication network. The preferred embodiment of the invention includes an active application processor 16 mated with a standby processor 26, running RCS applications in active 14 and standby 24 modes respectively, within a CDMA/TDMA cellular wireless communications system. The mated processors 16, 26 can be tightly paired in a specific pairing arrangement, or can be loosely paired as part of a processor cluster. The processors 16, 26 can be located at the same location, such as for example a cell site, or different locations. Examples of such systems include, but are not limited to, an Autoplex Flexent system, Flexent RCS, and Flexent Mobility Server (FMS) manufactured by Lucent Technologies. The cellular system can include a variety of cellular configurations including, but not limited to, modular and/or microcell cellular systems.

The active and standby processors 16, 26 each include memories 18 and 28 respectively. In accordance with the invention, the active and standby memories 18, 28 are divided into contiguous blocks called regions $18a–18n$, $28a–28n$ that will be replicated. Each region $18a–18n$, $28a–28n$ is further divided into one or more tuples, preferably of fixed length. For example, regions 18a and 28a include tuples $18a_1–18a_n$, and $28a_1–28a_n$ respectively.

A region $18a–18n$ and $28a–28n$ can be composed any suitable data structures, for example an array of structures, in which case the tuple is a single structure within the array. Each region $18a–18n$, $28a–28n$ is identified by a unique region identifier which is defined by the application 14, 24, a starting address, a tuple size and a count of the number of tuples in the region. Regions may not overlap. Usually, a region is a single global data area within the application. For example, an array of structures with call status information would be a region.

Further, each active memory region $18a–18n$ can be associated with one of 32 or more unique priority groups. The priority groups can be configured to prioritize the transmission of replicated data between the active and standby processes 12, 22, for example priority groups having a lower number will receive a higher priority with regards to the order of data transmission as described below. The active application 14 can also use this grouping to associate regions that have logical dependencies and need to be pushed to the standby process 22 at the same time.

By dividing application memory into a set of regions identified by address, size and number of blocks as described below, the invention allows for application memory management without needing further details about the layout of the memory within each block and thus is not application specific.

The invention further includes an application specific transport 40 connecting the active process 12 with the standby process 22. The invention does not specify how the replicated data is transmitted between the active and standby processes. Rather, the active application 14, or alternatively a plug-in module 42, specifies the transport as described below. The data can be transmitted using any suitable known data transmission protocol and/or hardware, including but not limited to TCP/IP, UDP, or Frame relay.

Referring now to FIG. 2, a method of replicating data between an active process 12 and a standby process 22 is shown generally at 50. The method includes initializing the active and standby DML instances 10, 20 at step 52. Initialization 52, which shall be described in further detail below, includes specifying each region of memory that may be replicated by identifying the region starting address, tuple length and total number of tuples.

The DML 10, 20 also performs a series of initialization steps to validate DML and application versions and to establish an initial pump of the application data to the standby process 22. During initialization 52, the active application 14 can operate normally, providing service and changing its data.

When the active application 14 changes data within the regions of the active processor memory 18, as shown at step 54, the changes to the tuple(s) are noted by a dataMark interface at 56 as described in further detail below. With the dataMark interface 56, the active DML instance 10 quickly makes a note of this change. For example, on a GNP-Application Processor in a cellular network, the implementation of dataMark can takes less than 50 uSec to execute.

At regular intervals, as determined by the active application 14, when the changes to the application data are complete and consistent as shown at 58, the application invokes a logicalPush as shown at 60. Data consistency 58 is determined by the application 14 in any suitable known manner. The logicalPush 60 encodes the changed data for a group of regions into transport payloads and requests that the active DML instance 10 transfer the accumulated changes to the standby process 22.

The frequency of invocations of the logicalPush interface 60 determines how current the standby process 22 is with respect to the active process 12. The frequency of invocations also determines the volume of data that must be pushed, with more frequent invocations resulting in smaller amounts of data transferred per invocation.

Referring now to FIG. 3, the logicalPush 60 is described in further detail. The logicalPush examines the set of marked data associated with each priority group, starting with the lowest group number, and encodes copies of the changed data at 62. The encoding assumes that both processors 16, 26 are the same including the same byte ordering, and same alignment rules.

The data is encoded as a series of updates at 64 with a header identifying the region, the starting offset and the length of the update (multiple tuple updates are possible when consecutive tuples have been data marked). As regions are encoded, the associated data marks, which indicate which tuples have changes, are copied to a physical bit vector. The physical bit vector tracks the changed tuples that have been encoded. Once a changed tuple has been encoded, the logical bit vector datamark is cleared at 66, since that tuple is now encoded for transport.

Next, the application specific transport is invoked at 68 to handle the transfer one or more payloads of replicated data to the standby process 22. The active application registers a callback function that provides the association between the DML code and the actual transport. The function provides an interface that allows a buffer of data of a specified length to be sent. The function returns an indication of success or failure using a set of return codes. The active application 14 handles all aspects of setting up any connection between the active 12 and standby 22 processes and/or routing the data to the standby process 22. Any connection setup is done by the active application 14 prior to DML initialization. Once the application specified transport send function is called, DML assumes that the data has been sent to the standby process 22 and will await an acknowledgment. Failure to transmit will result in recovery actions to reinitialize affected regions or resynchronization of the active and standby.

Figure 4:
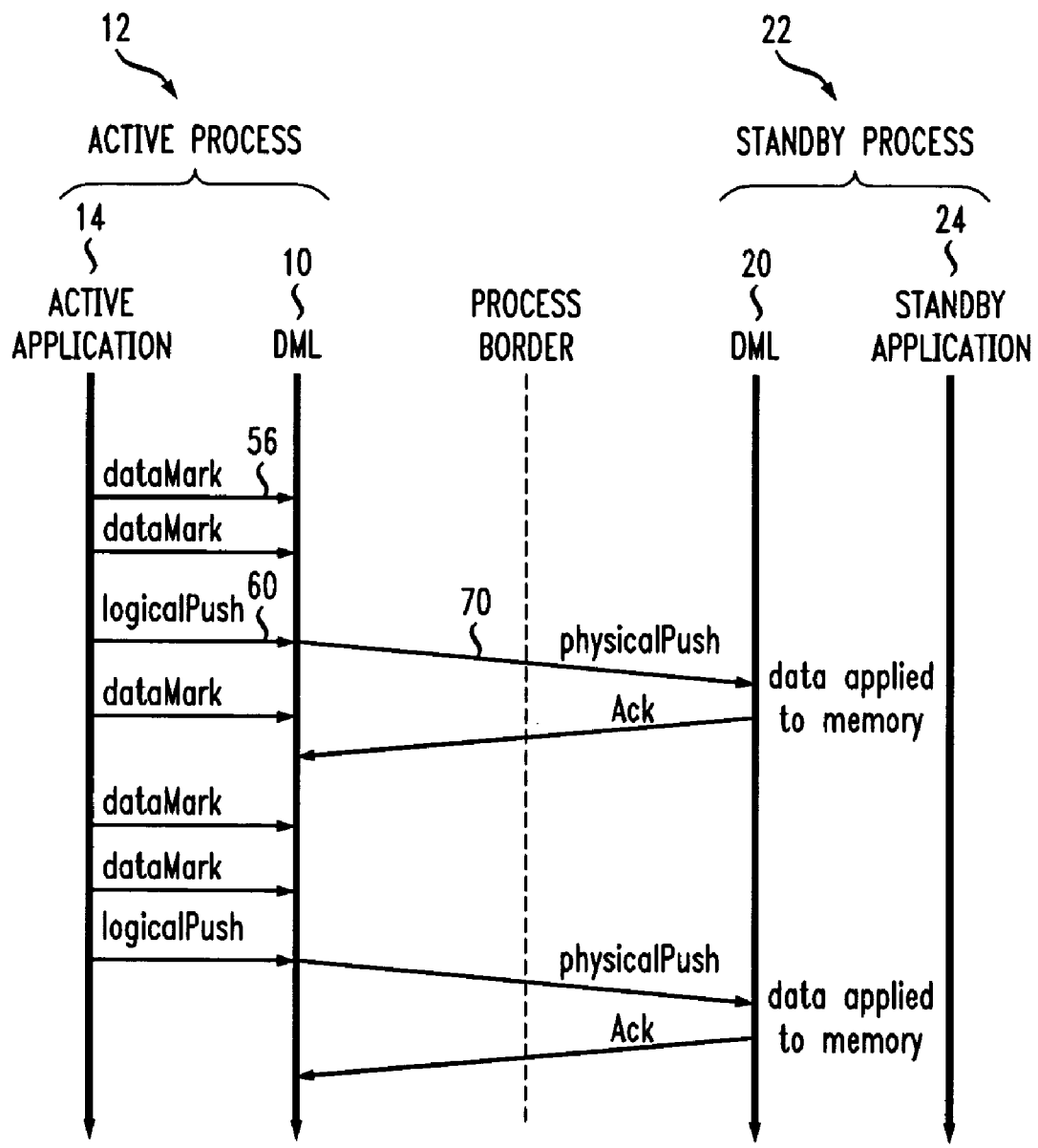
FIG. 4 is diagram illustrating a dataMark, logicalPush and physicalPush in accordance with the invention.

Next, a physical push occurs at 70 in which the copies of the changed data is transferred to the standby process 22 where the changes are applied directly to the standby processor's memory 28 via updates. A physical push 70 occurs when a logical push 60 is requested and necessary performance constraints have been met. Such constraints can include a metric of minimum data to be sent. Thus, a logical push 60 may not result in a physical push 70 if only a small amount of data has been marked prior to the logical push call. Instead, the physical transfer may be postponed to bundle up the changes until predetermined number of changes have accumulated, or some predetermined time interval has elapsed. A diagram illustrating the commands passed for the datamark 56, logical push 60 and physical push 70 is shown in FIG. 4.

The standby application receives the changed data and may de-multiplex the received data from other received messages if necessary in any known manner. A multi-threaded application might dedicate a socket to DML traffic, or if a single socket is used, an application header would be used to identify DML specific messages. The standby processor memory then receives the changed data via updates at 72.

After completion of the physical push at 70, the standby DML instance 20 returns an acknowledgement message to the active DML instance 10 indicating completion. Alternatively, the acknowledgement behavior may be specified so that only 1 of every N physical pushes are acknowledged. The acknowledgement is noted by invoking the DML receive method to pass the payload down to DML where the acknowledgement is noted thereby preventing a subsequent timeout that will occur when an ACK is not received within an application specified interval.

Figure 5:
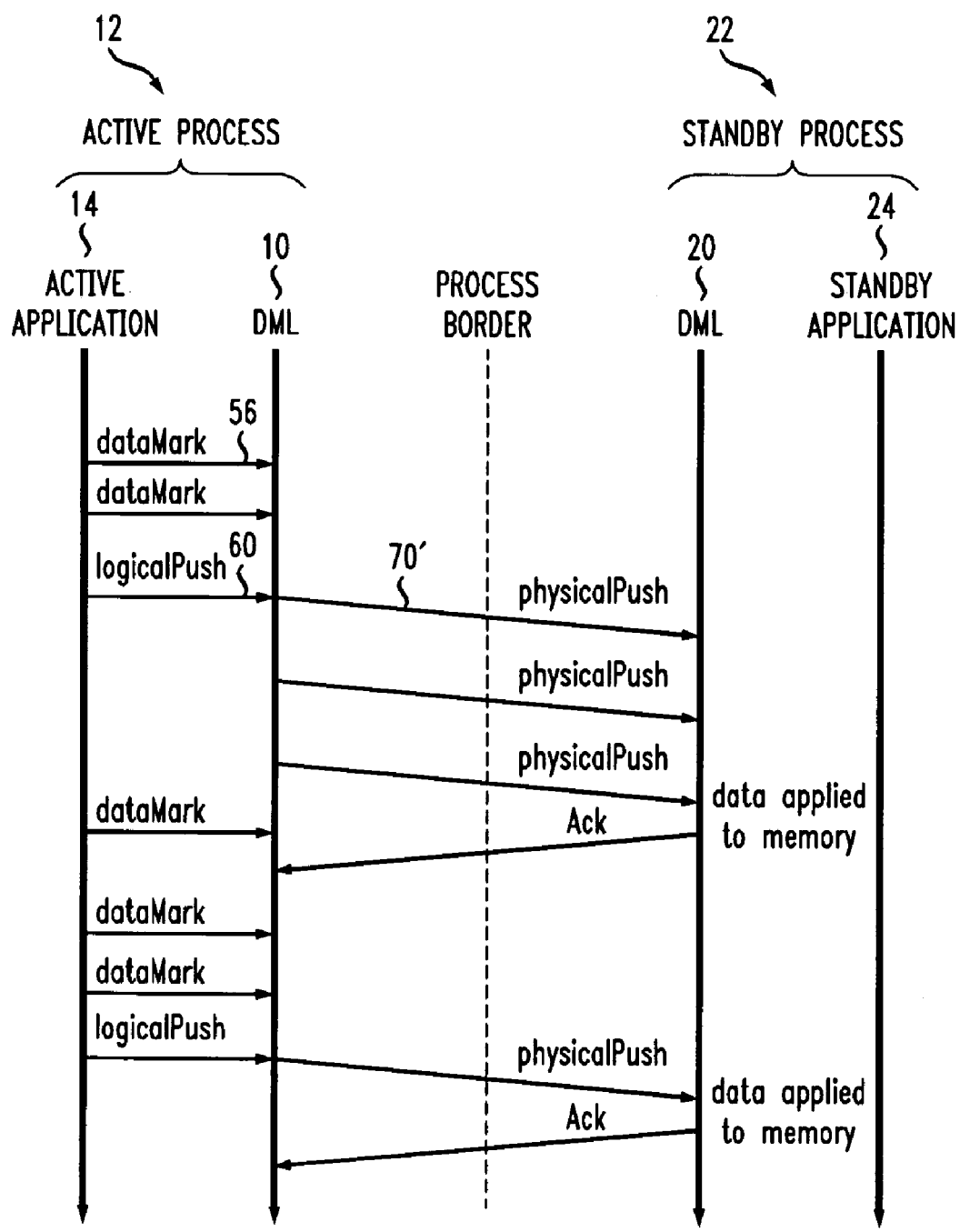
FIG. 5 is diagram illustrating a fragmented physicalPush in accordance with the invention.

Referring now to FIG. 5, a diagram is shown illustrated a fragmented physical push. If the encoded data for the physical push is larger than a single frame in the application transport buffer, the data can be fragmented across several payload frames as shown at 70'. The size of each fragment, as defined by a maxBufSize command, can vary according to the specific application transport employed.

The individual fragments contain sequence numbers and the last fragment contains an indication that it is the final fragment. If the physical push spans multiple frames, the fragments are stored until the final frame is received. At that point, if all fragments have been received, the data is decoded and the standby processor memory is updated.

Figure 6:
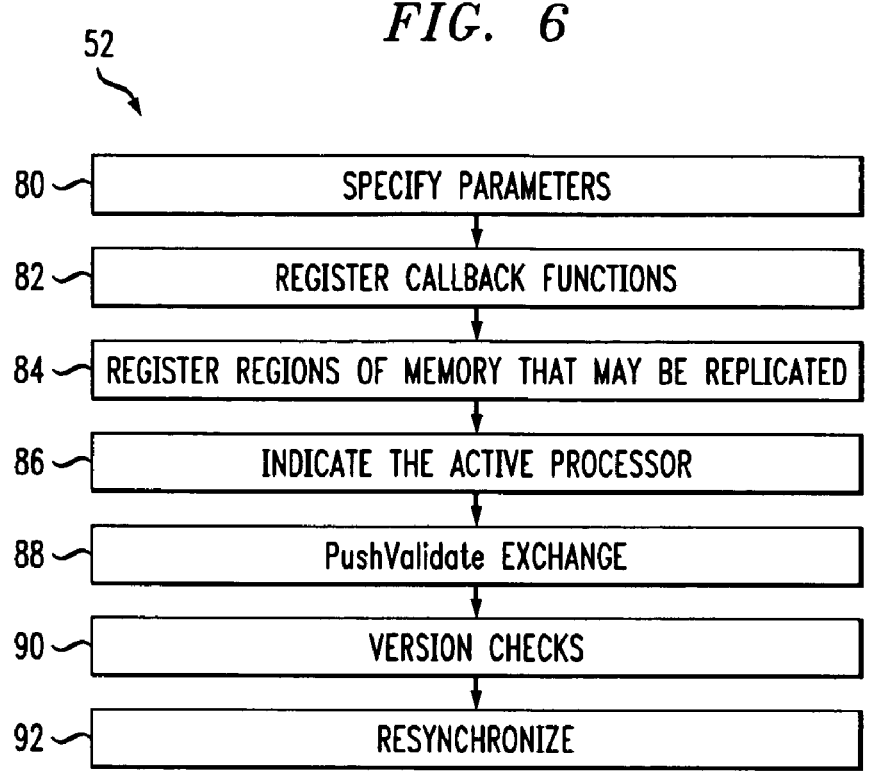
FIG. 6 is a block diagram illustrating the initialization step shown in FIG. 2.

Referring now to FIG. 6, the initialization step 52 is described in further detail. Initialization of the active DML instance 10 includes a series of one time only steps to initialize the DML. Initialization is also performed between the active DML instance 10 and the standby DMK instance 20.

The DML instance initialization consists of a series of calls to the active DML instance 10 to set parameters, register application callbacks and register application regions. The DML instance contains a static reference to the DML object, so no construction of the object by the application is necessary. The active application 14 first specifies required and optional parameters at 80 to control the operation of the DML instance 10, 20. Next, a series of callback functions are registered from the active application 14 to the active DML instance 10 using the registercallbacks method at 82. The only required callback is the application transport send function.

The active application 14 next registers all regions of memory that it wishes to participate in replication at 84. The application specifies the type of method used to perform the data replication, such as DataMark described herein. Alternatively RawCopy provides for data replication where an entire region or subset of a region is unconditionally copied to the standby process 22.

The active application also assigns a regionId such as an integer number to uniquely identify the region. The active application 14 also assigns an priorityGroup ID, such as an integer to identify which priority group the region belongs to. The starting address of each region, tuple length and number of tuples in the region are also identified.

At this time, all one-time startup initialization of the DML is complete and the active DML instance enters a quiescent state and no communication occurs between the active and standby DML instances 10, 20.

When the active application 14 determines which of the mated pair of processors 16, 26 is active, it informs the active DML 10 of this role change at 86. This step triggers a sequence of events that perform the remaining steps necessary for the DML to complete initialization and enter a state where normal data replication can be performed.

In the first step, the PushValidate exchange, the active DML instance 10 sends the internal DML version, the application version and a sequence of entries describing each registered region to the standby DML instance 20 at 88. The active DML instance 10 will attempt to send this message to the standby DML instance 20 once during each predetermined interval which is set using a initInteval command.

When the standby DML instance 20 is able to receive this message, the DML examines the internal DML version information and checks it for compatibility with the version running on the standby DML instance 20 at 90. If the versions are compatible, the application-supplied version is compared. If the application version check returns true, the version check is completed and a successful return is sent back to the active DML instance 10. If the versions were not compatible, a version mismatch is indicated and both the active and standby DML instances notify the active application 14 with a status of DrsVersionMismatch. After the successful version check, the active DML begins the resynchronization portion of initialization at 92 described below.

Figure 7:
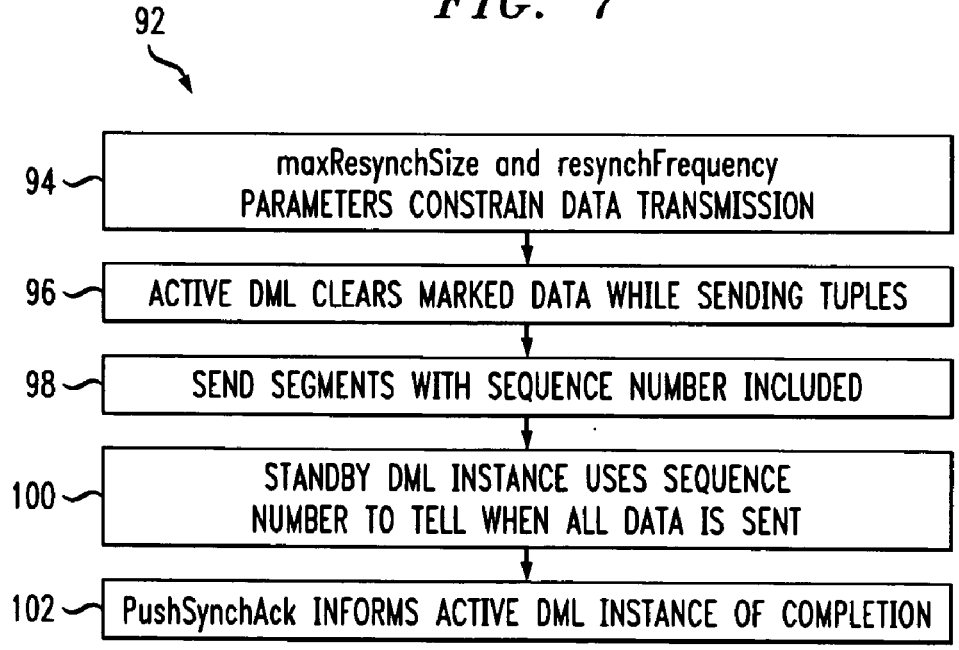
FIG. 7 is a block diagram illustrating resynchronization step shown in FIG. 4.

Occasionally the DML needs to resynchronize the standby process memory 28 with the active process memory 18. During resynchronization 92, shown in further detail in FIG. 7, a copy of the contents of the registered regions of the active processor memory 18 is sent to the standby processor memory 28, using the Data Pump method described below, to establish a starting point for subsequent changes. The active DML walks through the active application memory 18 in round-robin fashion and sends contiguous blocks of memory to the standby processor memory 28, also clearing any data marks for the sent regions as it goes.

There are a number of scenarios that can lead to a resynchronization 92, including initial startup of either the active or standby process 12, 22, as described above, or a restart of the standby application process 22 during which the standby process will lose all replicated data upon restart. As a recovery from certain error conditions, a partial resynchronization can be performed for only a subset of all registered priority groups.

A complete copy of the active processor memory 28 registered by the application is sent to the standby process 22 during resynchronization 92. During this interval, the standby application cannot take over the active role without performing an application reinitialization.

During a resynchronization 92, the standby process 22 regards its copy of the data as inconsistent, and continues to do so until resynchronization is complete. During the resynchronization interval, the active application 14 will be providing service and will likely be changing the replicated memory and, therefore, calling the dataMark method to note the changes. While the resynchronization is in progress, data marked changes will be pushed to the standby process 22 via logicalPush. These pushes can serve to delay the completion of resynchronization, but they do not impact the consistency of the data between the active and standby processes, and therefore, upon completion of resynchronization, the data is consistent between the active and standby processes.

The Data Pump phase sends the blocks of application memory during resynchronization. Data Pump can be constrained at 94 by maxResynchSize which sets the maximum size of data and resynchFrequency parameters which sets the frequency of replication. The active application 14 can tune these parameters to find the appropriate tradeoff between the resynchronization interval, and CPU and network traffic overhead. For example, a resynchFrequency of 10 milliseconds and a maxResynchSize of 20K will mean that the application will transfer 2 Mbytes/sec. The application will also utilize more CPU and will contribute a large amount of traffic to the application transport 40.

As the Data Pump phase is progressing, the active DML instance 20 clears any marked data as it sends the tuples at 96. If the tuple isn't marked again during the Data Pump phase, it is not resent, thereby avoiding sending the same tuple(s) more than once. Each segment of the Data Pump is transmitted without any acknowledgment expected from the standby application. Each segment contains a sequence number at 98 that is tracked by the standby DML at 100 to determine that all data segments have arrived.

As each frame of data arrives at the standby DML instance 20, it is applied to the standby processor memory 28. When all of the application data has been sent, and DML has completed one pass through all of the active application memory 18, a final indication is sent and, upon receipt of the final indication, the standby DML instance 20 verifies that all segments of the Data Pump phase arrived and were successfully applied to standby processor memory 28. At this point, the standby instance returns a PushSynchAck message at 102 to inform the active side of completion of the Data Pump phase. If the PushSynchAck message is lost, or if it indicates a failure, the active side will initiate a re-initialization. If all went well, the active DML instance 10 will notify the active application by invoking the statusCallback with a status value of DrsStatNormal.

Figure 8:
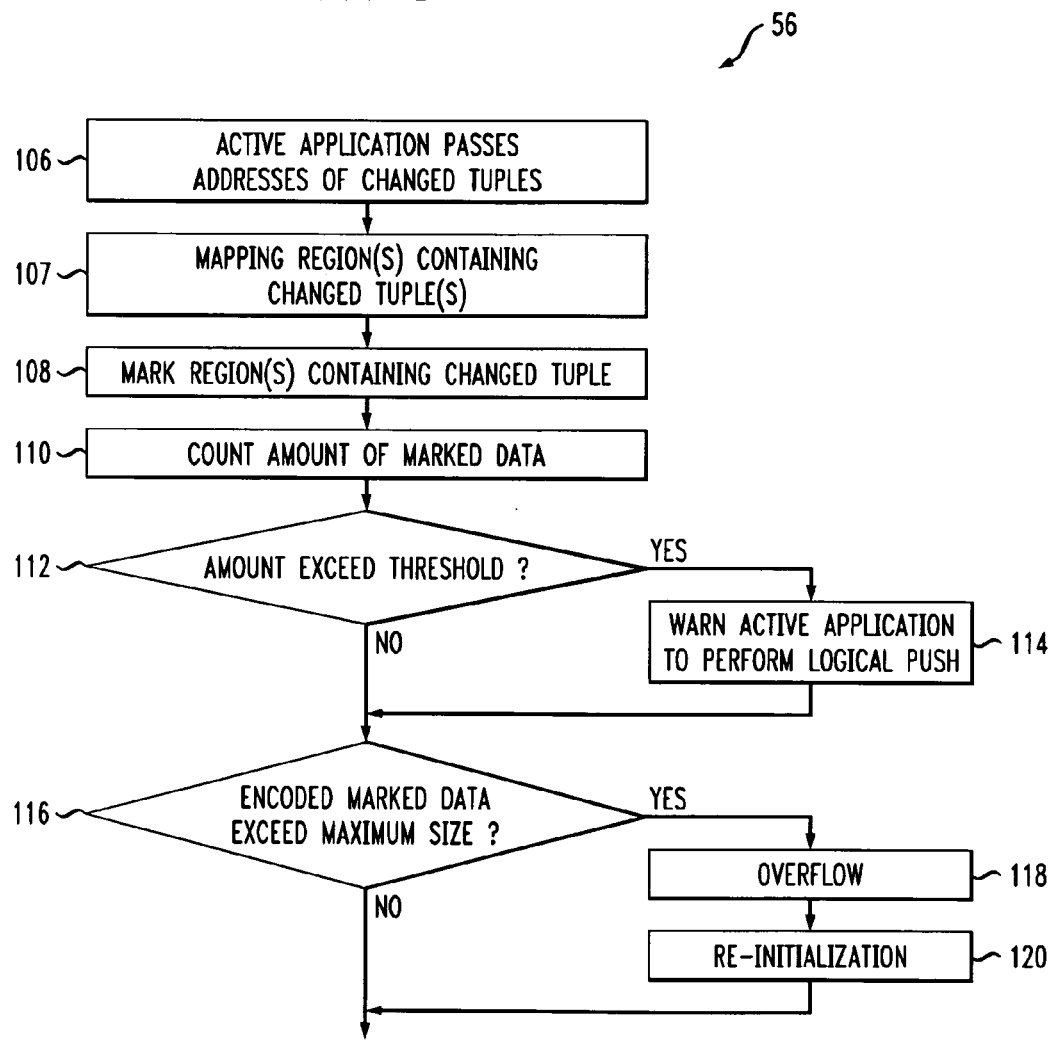
FIG. 8 is a block diagram illustrating datamarking step shown in FIG. 2.

Referring now to FIG. 8, the datamarking interface 56 and method of datamarking is described in further detail. When the active application 14 makes a change to memory 18 that has been registered as described above, it calls dataMark 56 to track the changes. A record(s) of the changes to the data is made to indicate that the associated data changes will need to be pushed to the standby process 22 at some later time. Any suitable record can be made, one example which should not be considered limiting includes using a dirty bit.

The changes are tracked on a tuple basis. The application 14 passes an address to dataMark at 106, which could be the address of the changed tuple or a field within the changed tuple. The active DML instance 10 maps the range of addresses to a region or regions of memory registered by the active application 14 at 107 and marks the region(s) at 108. Any suitable mapping method can be used. For example, the preferred embodiment uses a utilizes a known balanced binary tree, which insures that the depth of all branches of the tree differs by no more than 2 levels.

On a successful dataMark, when the region associated with the address has been found, the change is tracked. In the preferred embodiment, a variable length bit vector is used, where each bit represents a tuple in the region. This approach works well for regions with smaller numbers of tuples. Another approach includes using a known linked list.

As the region is marked, also referred to as datamarked, a count of the amount of marked data is tracked based on the priority group to which it belongs at 110. When the amount marked in a priority group exceeds a threshold, as determined at 112, the active application 14 is signaled at 114 that a logicalPush should be performed for that priority group soon to avoid the risk exceeding the amount of marked data in a priority group that can be encoded and transmitted. The maximum amount can be defined by the maxTransmitSize parameter.

As indicated at 116, if the marked data accumulated for a priority group would encode to a size greater than the maximum size defined by maxTransmitSize, an overflow condition occurs at 118 and dataMark throws a DrsExceptionTxOverflow exception. When the overflow condition is reached, a subsequent call to logicalPush will trigger resynchronization of the application memory from the active processor 16 to the standby processor 26 as described above at 92. A partial resynchronization involving only the affected priority group(s) can be performed.

The system and method of data replication of the invention not only assists in replicating data between the active and standby processes as quickly and efficiently as possible, but enables the active application 14 to know at all times whether the standby process's data is consistent with that of the active process. When events occur that are a clear indication that consistency no longer exists, actions are taken to restore consistency as quickly as possible using resynchronization 92 as described above.

A further step taken to ensure data consistency is a data audit. A data audit is an optional capability to send portions of the active memory to the standby side for comparison at the standby side. The application can choose if the audit will be disabled, or if the audit will perform comparisons and report errors with no changes to the standby memory or if the standby memory is to be overwritten. The portions of active memory to send are controlled by application specified parameters. Only tuples that have not been data marked are sent to the standby process in the data audit.

DML also performs a periodic heartbeat, sending information from the active application to the standby side so that the standby side can detect when it has missed a physical push or has lost communication with the active side. This information is used to provide parameters to the active application 14 used in deciding how "stale" the replicated data is within the standby process. The heartbeat message is sent every predetermined interval, as determined by heartbeatInterval. The interval is typically a few tens of milliseconds, although any suitable interval may be used. By default, the heartbeat only contains the current physical push sequence number, so that missed pushes can be detected, and status change requests from the active to the standby.

The application can optionally specify that the heartbeat message also carries audit information described above. The data audit could be useful for in lab testing to verify that data marking is being performed correctly by the application and that DML is replicating data correctly. The audit cycles through the registered regions in the active application and encodes data that corresponds to unmarked data. The audit data is sent with the heartbeat with a special flag set in the heartbeat header to indicate that audit data follows the heartbeat message. On the standby side, upon receipt of this heartbeat message, the application memory is compared to the raw memory in the audit and if there is a mismatch, a diagnostic message is generated.

When the standby application is promoted to active, it must determine if the data that it has is safe to use or if a reinitialization is necessary. The standby application can use two DML capabilities in making this determination.

The replicated data is considered invalid if the resynchronization that accompanies a reinitialization has not yet completed, or did not complete successfully, or if at some point the active application 14 declared this data to be invalid. In these cases, the standby application 24 should not use the replicated data.

The standby application 24 also needs to be able to determine if its copy of the data from the active application 14 is up to date. The invention provides two metrics that can be used by the application to determine how recently the data was updated and if some number of updates were lost. The stale( ) interface returns true if the last update to the standby application was longer than a predetermined interval defined by a staleTimeout value as specified by the active application 14.

The stale( ) interface also returns the number of physical pushes that were missed and the number of milliseconds that have elapsed since the last update to the standby processor memory 28 in the arguments to the function. The missed physical push and last update parameters are reset to 0, after completion of a resynchronization or after the standby application is transitioned to Active. This information is used to decide if the replicated data is recent enough to use or if some level of audit or resynchronization should be performed before the standby application transitions to the active application using the replicated data.

It is desirable that new versions of DML can be installed by updating a shared library on a field installation. This goal can be served by separating the DML interface from it's implementation, since such a separation can help make it less likely that an implementation change leads to an interface change.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

What is claimed is:

1. A method of replicating changed data between an active process including an application and processor having memory and a standby process including an application and processor having memory comprising:

organizing active and standby process memories into regions, each region including one or more tuples and identified by a unique region identifier, an address, a tuple size and a tuple count of the number of tuples in the region;

datamarking tuples having changed data in the active process corresponding to the active application;

transferring copies of only the changed data from the active process to the standby process using the region identifiers, addresses, tuple sizes and tuple counts to replicate data between the active and standby processors.

2. The method of replicating changed data defined in claim 1 further comprising the step of encoding the changed data into transport payloads, and the transferring step further comprises transferring the payloads.

3. The method of replicating changed data defined in claim 2 wherein the encoding step further comprises encoding the changed data as updates, and the transferring step includes updating the standby processor memory with the changed data.

4. The method of replicating changed data defined in claim 3 wherein the organizing step further comprises organizing the regions into priority groups and the encoding step includes encoding changed data according to the priority groups.

5. The method of replicating changed data defined in claim 3 wherein the encoding step further comprises encoding data with an update header identifying region, starting offset and length of the update.

6. The method of replicating changed data defined in claim 1 wherein the datamarking step further comprises mapping the range of addresses of the changed data.

7. The method of replicating changed data defined in claim 6 further including marking the mapped regions containing the changed tuples.

8. The method of replicating changed data defined in claim 6 wherein the mapping step includes utilizing a balanced binary tree.

9. The method of replicating changed data defined in claim 4 wherein the datamarking step further includes counting the amount of marked data and tracking the counts for each priority group.

10. The method of replicating changed data defined in claim 9 further including signaling for the encoding step when the amount of marked data exceeds a threshold.

11. The method of replicating changed data defined in claim 1 wherein the datamarking step further comprises copying the datamarks to physical bit vectors and clearing logical bit vector datamarks after the data is encoded in the encoding step.

12. The method of replicating changed data defined in claim 1 further comprising resynchronizing the standby process memory with the active process memory by copying and transferring contiguous blocks of memory from the active processor memory to the standby processor memory.

13. The method of replicating changed data defined in claim 12 wherein the resynchronizing step further comprises clearing data marks for the sent regions.

14. The method of replicating changed data defined in claim 1 further comprising the step of performing a data audit comprising sending portions of the active processor memory which have not been datamarked to the standby process and comparing the sent portions with the corresponding portions of the standby processor memory.

15. The method of replicating changed data defined in claim 14 further comprising reporting errors to the active application without changing the standby memory.

16. The method of replicating changed data defined in claim 15 further comprising overwriting the corresponding portions of the standby processor memory.

17. The method of replicating changed data defined in claim 1 further comprising sending a periodic heartbeat message from the active process to the standby process, wherein the heartbeat message includes the current physical push sequence number for detecting missed pushes of replicated data.

18. The method of replicating changed data defined in claim 17 wherein the heartbeat message further includes audit information including data not having been datamarked for comparison with the standby processor memory.

19. A method of replicating changed data in a cellular wireless communication network between an active process including an active radio control software application and an active application processor having memory and a standby process including a standby radio control software application and a standby application processor having memory comprising:

organizing the active and standby application processor memories into regions, each region including one or more tuples and identified by a unique region identifier, an address, a tuple size and a tuple count of the number of tuples in the region;

datamarking the tuples having changed data in the active application processor corresponding to the active radio control software application;

transferring copies of only the changed data from the active process to the standby process using the region identifiers, addresses, tuple sizes and tuple counts to replicate data between the active and standby application processors.

20. The method of replicating changed data defined in claim 19 wherein the cellular wireless communication network is a CDMA network.

21. The method of replicating changed data defined in claim 19 wherein the cellular wireless communication network is a TDMA network.

22. A system for replicating data comprising:

a mated pair of application processors including an active processor for running an active application and a standby processor for running a standby application, the active and standby processors each having corresponding memories divided into corresponding regions and tuples each identified by a unique region identifier, an address, a tuple size and a tuple count of the number of tuples in the region;

datamarking means for mapping and marking tuples of data changed in the active processor memory;

encoding means for encoding the changed data into transport payloads; and transferring means for transferring copies of only the changed data from the active processor to the standby processor using the region identifiers, addresses, tuple sizes and tuple counts.

23. The system for replicating data defined in claim 22 wherein the transferring means is specified by the active application.

24. The system for replicating data defined in claim 22 wherein the encoding means encodes the changed data as updates, and further comprising updating means for updating the standby processor memory with the changed data.

25. The system for replicating data defined in claim 22 wherein the datamarking means maps the range of addresses of the changed data.

26. The system for replicating data defined in claim 25 wherein the datamarking means marks the mapped regions containing the changed tuples.

27. The system for replicating data defined in claim 26 wherein the datamarking means utilizes a balanced binary tree.

28. The system for replicating data defined in claim 26 wherein the datamarking means counts the amount of marked data and tracks the counts by priority groups.

29. The system for replicating data defined in claim 28 wherein the datamarking means signals the encoding means when the amount of marked data exceeds a threshold.

30. The system for replicating data defined in claim 22 wherein the system is a cellular wireless communication system.

31. A cellular wireless communication system for replicating data comprising:

a mated pair of application processors including an active processor for running an active application and a standby processor for running a standby application, the active and standby processors each having corresponding memories divided into corresponding regions and tuples each identified by a unique region identifier, an address, a tuple size and a tuple count of the number of tuples in the region;

datamarking means for mapping and marking tuples of data changed in the active processor memory;

encoding means for encoding the changed data into transport payloads; and transferring means for transferring copies of only the changed data from the active processor to the standby processor using the region identifiers, addresses, tuple sizes and tuple counts.

32. The cellular wireless communication system defined in claim 31 wherein the cellular system is a CDMA cellular system.

33. The cellular wireless communication system defined in claim 31 wherein the cellular system is a TDMA cellular system.

34. The cellular wireless communication system defined in claim 31 wherein the active and standby applications are Radio Control Software instances.

* * * * *